US012090353B2

(12) United States Patent
Fazzio

(10) Patent No.: US 12,090,353 B2
(45) Date of Patent: Sep. 17, 2024

(54) FIRE EXTINGUISHERS, FIRE SUPPRESSION SYSTEMS, AND METHODS OF CONTROLLING FLOW OF FIRE SUPPRESSANT AGENTS

(71) Applicant: Kidde Technologies, Inc., Wilson, NC (US)

(72) Inventor: Mark P. Fazzio, Wilson, NC (US)

(73) Assignee: KIDDE TECHNOLOGIES, INC., Wilson, NC (US)

(*) Notice: Subject to any disclaimer, the term of this patent is extended or adjusted under 35 U.S.C. 154(b) by 269 days.

(21) Appl. No.: 17/206,236

(22) Filed: Mar. 19, 2021

(65) Prior Publication Data

US 2021/0290998 A1 Sep. 23, 2021

Related U.S. Application Data

(60) Provisional application No. 62/992,274, filed on Mar. 20, 2020.

(51) Int. Cl.
*A62C 3/08* (2006.01)
*A62C 99/00* (2010.01)
*A62C 37/36* (2006.01)

(52) U.S. Cl.
CPC ............ *A62C 3/08* (2013.01); *A62C 99/0018* (2013.01); *A62C 37/36* (2013.01)

(58) Field of Classification Search
CPC ....... A62C 3/08; A62C 99/0018; A62C 37/36; A62C 35/68
USPC ................................. 169/16; 239/132–132.5
See application file for complete search history.

(56) References Cited

U.S. PATENT DOCUMENTS 7,434,628 B2 10/2008 Scheidt
8,887,820 B2 * 11/2014 Hill .................... A62C 99/0018 169/11
2007/0158085 A1 * 7/2007 Bourdet ............... A62C 35/023 169/5
2008/0184711 A1 8/2008 Hingst
2022/0314050 A1 * 10/2022 Ellefskas ............... A62C 35/68

FOREIGN PATENT DOCUMENTS

DE 202011004934 U1 7/2012
EP 2491985 A2 8/2012
EP 3284676 A1 2/2018
WO 2015138732 A1 9/2015

OTHER PUBLICATIONS

Abstract of DE202011004934U1, 1 page.
European Search Report for European Application No. 21163662.6; dated Aug. 25, 2021, 82 pages.

* cited by examiner

*Primary Examiner* — Christopher S Kim
(74) *Attorney, Agent, or Firm* — CANTOR COLBURN LLP

(57) ABSTRACT

A fire extinguisher includes a source conduit, a flow control device connected to the source conduit, and a supply conduit. The supply conduit is connected to the flow control device, is fluidly coupled therethrough to the source conduit, and is thermally coupled to the source conduit to communicate heat between pressurized fire suppression agent entering the flow control device through the source conduit and expanded fire suppression agent issuing from the flow control device through the supply conduit. Fire suppression systems and methods of controlling flow of fire suppressant agents are also described.

16 Claims, 7 Drawing Sheets

FIRE EXTINGUISHERS, FIRE SUPPRESSION SYSTEMS, AND METHODS OF CONTROLLING FLOW OF FIRE SUPPRESSANT AGENTS

CROSS-REFERENCE TO RELATED APPLICATIONS

This application claims priority to U.S. Provisional Application No. 62/992,274 filed Mar. 20, 2020, the contents of which are incorporated herein by reference in its entirety.

BACKGROUND

The present disclosure is generally directed to fluid systems, and more particularly to fluid flow in fluid systems, such as fire suppression agents in fire extinguishers and fire suppression systems.

Vehicles, such as aircraft, commonly include fire suppression systems to suppress fire within spaces onboard the vehicle. Such fire protection systems are generally arranged to introduce a fire suppressant agent into a space from a suppressant reservoir upon detection of a fire, generally with an initial high rate discharge (HRD) of agent followed by a low rate discharge (LRD) of agent. The HRD of agent issues into the space at a relatively high mass flow rate for a relatively short period of time to knock down the fire upon actuation of the system. The LRD of agent thereafter issues into the space at a lower mass flow rate for a longer period of time, typically as a continuous issue, to prevent the fire from restarting. In the case of aircraft, the continuous issue provides time sufficient to land the aircraft.

Issue of the LRD agent into the space generally entails expanding a flow of pressurized fire suppressant using a flow control device. Since pressure of the fire suppressant provided to the flow control device decays over time during issue, and the magnitude of the Joule-Thompson temperature of the expansion varies according to pressure, such flow control devices are typically provided with features that allow the flow control device to provide the continuous flow of LRD agent over a range of temperatures, e.g., variable apertures and/or throttle valves. Such features add complexity and cost the flow control device Such systems and methods have generally been acceptable for their intended purposes. However, there remains a need in the art for improved fire extinguishers, fire suppression systems, and methods of controlling flow of fire suppressant agent through fire suppression systems.

BRIEF DESCRIPTION

Disclosed is a fire extinguisher that includes: a source conduit: a flow control device connected to the source conduit: and a supply conduit connected to the flow control device and fluidly coupled therethrough to the source conduit. The supply conduit is thermally coupled to the source conduit to communicate heat between an expanded fire suppressant flow issued by the flow control device and a pressurized fire suppressant flow entering the flow control device.

In addition to one or more of the features described above, or as an alternative to any of the foregoing embodiments, the fire extinguisher may further include a heat exchanger arranged along the source conduit and the supply conduit, wherein the supply conduit is thermally coupled to the source conduit be the heat exchanger.

In addition to one or more of the features described above, or as an alternative to any of the foregoing embodiments, the expanded fire suppressant flow in the supply conduit flows in a direction opposite the pressurized fire suppressant flow in the source conduit.

In addition to one or more of the features described above, or as an alternative to any of the foregoing embodiments, the source conduit and the supply conduit have a common wall segment with a first surface and a second surface separated by wall thickness, the first surface bounding the source conduit, and the second surface bounding the supply conduit.

In addition to one or more of the features described above, or as an alternative to any of the foregoing embodiments, the fire extinguisher may further include a fin extending from at least one of the first surface and the second surface of the common wall segment the wall thickness thermally coupling the fin to the other of the first surface and the second surface.

In addition to one or more of the features described above, or as an alternative to any of the foregoing embodiments, the fire extinguisher may further include a pin extending from at least one of the first surface and the second surface of the common wall segment, the wall thickness thermally coupling the pin to the other of the first surface and the second surface.

In addition to one or more of the features described above, or as an alternative to any of the foregoing embodiments, the flow control device includes a nozzle or a valve separating the source conduit from the supply conduit.

In addition to one or more of the features described above, or as an alternative to any of the foregoing embodiments, the flow control device includes an orifice plate separating the source conduit from the supply conduit.

In addition to one or more of the features described above, or as an alternative to any of the foregoing embodiments, the fire extinguisher may further include a pressure vessel connected to the source conduit and fluidly coupled therethrough to the flow control device.

In addition to one or more of the features described above, or as an alternative to any of the foregoing embodiments, the fire extinguisher may further include a pressurized fire suppressant agent contained within the pressure vessel.

In addition to one or more of the features described above, or as an alternative to any of the foregoing embodiments, the fire extinguisher may further include a pressurized fire suppressant agent including one or one or more of a chlorofluorocarbon compound, a hydrochlorofluorocarbon compound, a hydrofluorocarbon compound, and a mixture thereof contained within the pressure vessel.

In addition to one or more of the features described above, or as an alternative to any of the foregoing embodiments, the fire extinguisher may further include a retainer arranged along the source conduit having an active state and an inactive state, the retainer fluidly coupling a pressure vessel to the flow control device in the active state, the retainer fluidly separating the pressure vessel from the flow control device in the inactive state.

In addition to one or more of the features described above, or as an alternative to any of the foregoing embodiments, the fire extinguisher may further include an actuator operatively connected to the retainer and arranged switch the retainer between the active state and the inactive state.

In addition to one or more of the features described above, or as an alternative to any of the foregoing embodiments, the fire extinguisher may further include a sensor configured to detect fire within a protected space and disposed in communication with the actuator.

In addition to one or more of the features described above, or as an alternative to any of the foregoing embodiments, the supply conduit is in fluid communication with a cargo compartment on an aircraft.

Also disclosed is a fire suppression system that includes a low rate discharge (LRD) section that includes including a fire extinguisher as in any prior embodiment, wherein the supply conduit is in fluid communication with a protected space. The system can further include a high rate discharge (HRD) section in fluid communication with the protected space, a sensor disposed in communication with the protected space and arranged to detect fire in the protected space: and an actuator disposed in communication with the sensor operably connected to the LRD section and the HRD section.

In addition to one or more of the features described above, or as an alternative to any of the foregoing embodiments, the system can also include an LRD pressure vessel connected to the source conduit and fluidly coupled therethrough to the flow control device: an LRD pressurized fire suppressant agent including one or one or more of a chlorofluorocarbon compound, a hydrochlorofluorocarbon compound, a hydrofluorocarbon compound and a mixture thereof contained within the LRD pressure vessel: an HRD pressure vessel connected to the protected space by the HRD section; and an HRD pressurized fire suppressant agent including one or one or more of a chlorofluorocarbon compound, a hydrochlorofluorocarbon compound, a hydrofluorocarbon compound, and a mixture thereof contained within the HRD pressure vessel.

In addition to one or more of the features described above, or as an alternative to any of the foregoing embodiments, in the system the source conduit has a wall with a first surface and a second surface separated by wall thickness, the first surface bounding the source conduit, and the second surface bounding the supply conduit, the expanded fire suppressant flow traversing the supply opposes the pressurized fire suppressant flow traversing the source conduit, and the supply conduit is in fluid communication with a cargo compartment on an aircraft.

Also disclosed is a method of controlling flow of a fire suppressant agent. The method includes: t a fire extinguisher including a source conduit, a flow control device connected to the source conduit, and a supply conduit connected to the flow control device and fluidly coupled therethrough to the source conduit, the supply conduit thermally coupled to the source conduit: receiving a pressurized fire suppressant flow at the source conduit: communicating the pressurized fire suppressant flow to the flow control device through the source conduit: expanding the pressurized fire suppressant flow with the flow control device to generate an expanded fire suppressant flow: communicating heat between the expanded fire suppressant flow to additional pressurized fire suppressant provided to the flow control device: and issuing the expanded fire suppressant flow to a protected space subsequent to communicating heat between the expanded fire suppressant flow to additional pressurized fire suppressant provided to the flow control device.

In addition to one or more of the features described above, or as an alternative to any of the foregoing embodiments, in the method the fire extinguisher is included in a low rate discharge (LRD) section of a fire suppression system, the method further comprising: detecting a fire in a protected space: issuing a high rate discharge (HRD) fire suppressant agent into the protected space from an HRD section of the fire suppression system: and issuing an LRD fire suppressant agent into the protected space from the LRD section of the fire suppression system.

Technical effects of the present disclosure include fire extinguishers which subject the fire extinguisher flow control device to relatively small temperature ranges during issue of pressurized fire suppressant agent from the flow control device. Technical effects of the present disclosure also include the capability to communicate heat between expanded fire suppressant agent issuing from the fire extinguisher flow control device and pressurized fire suppressant agent provided to the flow control device. Technical effects of the present disclosure further include fire extinguishers with flow control devices that are relatively simple, easy to make, and/or which are inexpensive.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
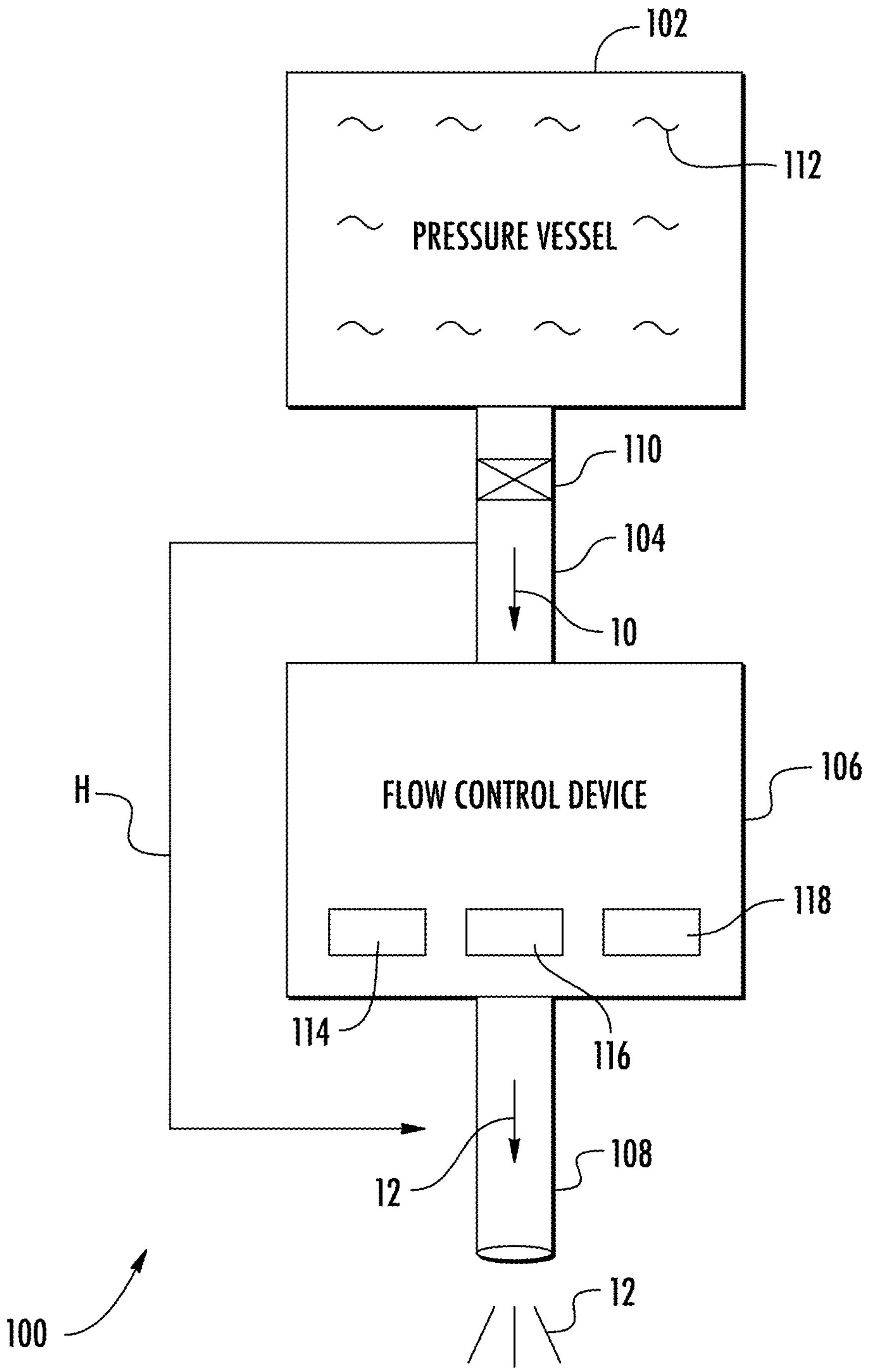
FIG. 1 is a schematic view of a fire extinguisher constructed in accordance with the present disclosure, showing a pressure vessel connected to a supply conduit through a flow control device and a source conduit.

Reference will now be made to the drawings wherein like reference numerals identify similar structural features or aspects of the subject disclosure. For purposes of explanation and illustration, and not limitation, a partial view of an example of a fire extinguisher is shown in FIG. 1 and is designated generally by reference character 100. Other examples of fire extinguishers, fire suppression systems, and methods of controlling flow of fire suppressant agents in fire extinguishers are provided in FIGS. 2-8, as will be described. The systems and methods described herein can be used to provide fire protection, such as in cargo compartments on aircraft, though the present disclosure is not limited to any particular type of protected space or to aircraft in general.

Referring to FIG. 1, the fire extinguisher 100 is shown. The fire extinguisher 100 includes a pressure vessel 102, a source conduit 104, and a flow control device 106. The fire extinguisher 100 also includes a supply conduit 108 and a retainer 110. The pressure vessel 102, e.g., a bottle, contains therein a fire suppressant agent 112. In certain examples the fire suppressant agent 112 includes a pressurized gas. In accordance with certain examples the fire suppressant agent 112 includes a chlorofluorocarbon compound, hydrochlorofluorocarbon compound, a hydrofluorocarbon compound, or a mixture of such compounds.

The pressure vessel 102 is connected to the source conduit 104 and is fluidly coupled therethrough to the flow control device 106. The retainer 110 is arranged along the source conduit 104 and is arranged for selectively communicating the fire suppressant agent 112 as a pressurized fire suppressant flow 10 to the flow control device 106. The flow control device 106 is connected to supply conduit 108 and fluidly couples the source conduit 104, and therethrough the pressure vessel 102, to the supply conduit 108, and is arranged to issue therefrom an expanded fire suppressant flow 12 with a constant mass flow rate during decay of pressure within the pressure vessel 102. In certain examples the flow control device 106 includes a nozzle 114. In accordance with certain examples the flow control device 106 includes a valve 118. It is also contemplated that, in accordance with certain examples, the flow control device 106 can include an orifice plate 116.

As will be appreciated by those of skill in the art in view of the present disclosure, expanding of a pressurized fluid, e.g., the pressurized fire suppressant flow 10, generally causes the fluid to decrease in temperature according to the Joule-Thompson effect. As will also be appreciated by those of skill in art in view of the present disclosure, the magnitude of the temperature decrease corresponds to pressure change during the expansion of the pressurized fluid. In the case of fluid systems where the pressure drop across the flow control device changes over time, e.g., due decay of pressure of the fire suppressant agent 112 contained within the pressure vessel 102, the device doing the expanding, e.g., the flow control device 106, experiences a temperature range. The temperature range associated with the expansion generally requires that the flow control device be arranged to accommodate the temperature range in order to provide a continuous mass flow rate of fluid issued from the flow control device.

To limit (or eliminate entirely) the need to accommodate such temperature ranges the flow control device is arranged to communicate heat H between the expanded fire suppressant flow 12 issuing from the flow control device 106 and the pressurized fire suppressant flow 10 provided to the flow control device 106. Communication of the heat H between the expanded fire suppressant flow 12 issuing from the flow control device 106 and the pressurized fire suppressant flow 10 provided to the flow control device 106 limits the temperature range, e.g., the temperature range 14 (shown in FIG. 6) during the issue interval relative to the larger temperature range 16 (shown in FIG. 6), to which the flow control device 106 is otherwise exposed due to pressure decay within the pressure vessel 102. Limiting the temperature range experienced by the flow control device 106 allows the flow control device 106 to be relatively simple in arrangement, limiting cost of the fire extinguisher 100.

Figure 2:
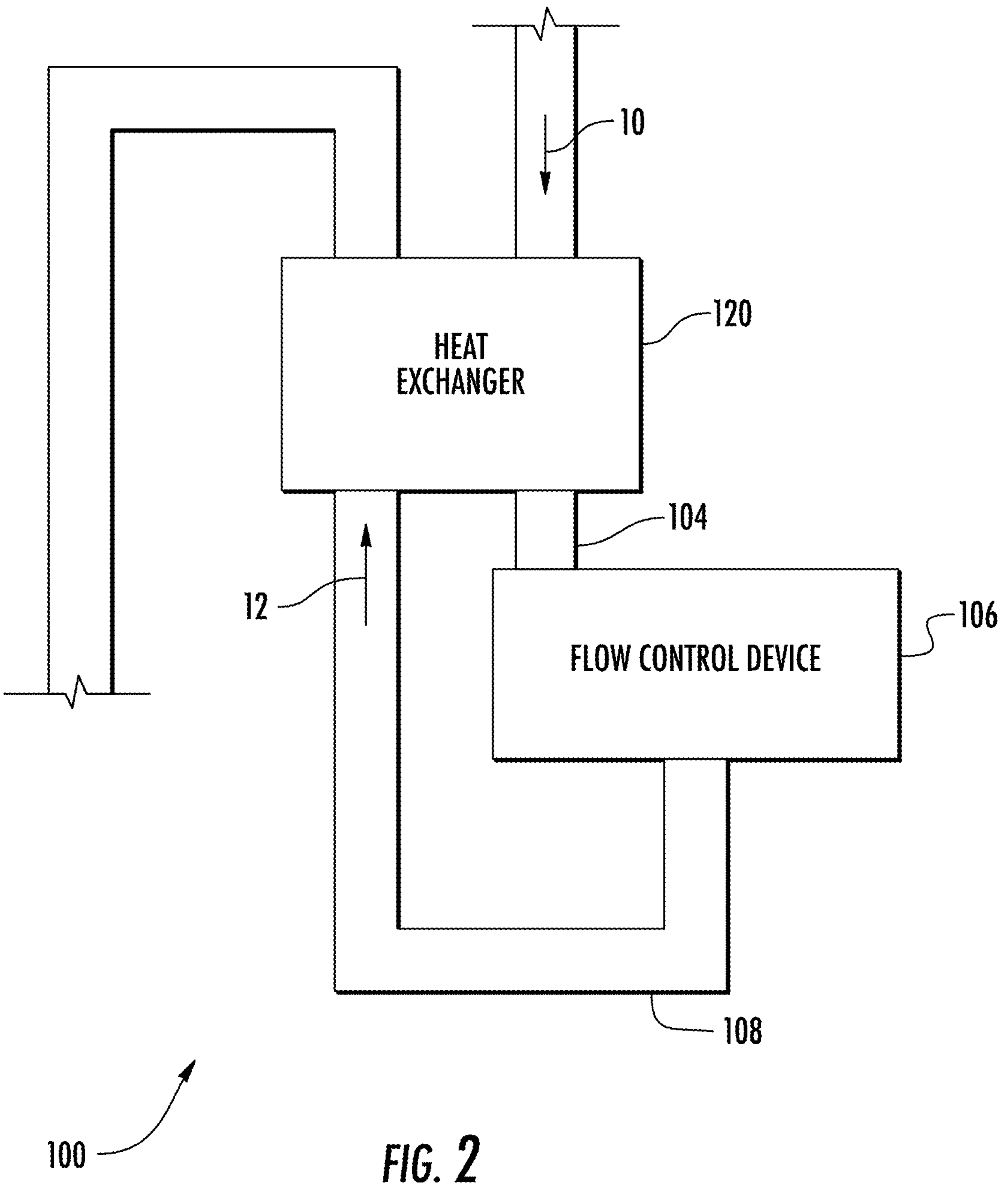
FIG. 2 is a schematic view of the fire extinguisher of FIG. 1 according to an example, showing a heat exchanger communicating heat between expanded fire suppressant agent issued by the flow control device and pressurized fire suppressant provided to the flow control device.

With reference to FIG. 2, the fire extinguisher 100 is shown according to an example. In the illustrated example the fire extinguisher 100 includes a heat exchanger 120. The heat exchanger 120 is configured to communicate heat H between the source conduit 104 and the supply conduit 108. In this respect the source conduit 104 and the supply conduit 108 extend through the heat exchanger 120 such that the heat exchanger 120 communicates the heat H (shown in FIG. 2) between the expanded fire suppressant flow 12 issued by the flow control device 106 and the pressurized fire suppressant flow 10 entering the flow control device 106. In certain examples the heat exchanger 120 is a counterflow heat exchanger, the expanded fire suppression agent flow 12 traversing the heat exchanger 120 in a direction opposite that of the pressurized fire suppressant flow 10. In accordance with certain examples the heat exchanger 120 is a crossflow heat exchanger. It is also contemplated that, in accordance with certain examples that the heat exchanger 120 can be a common flow direction heat exchanger.

Figure 3:
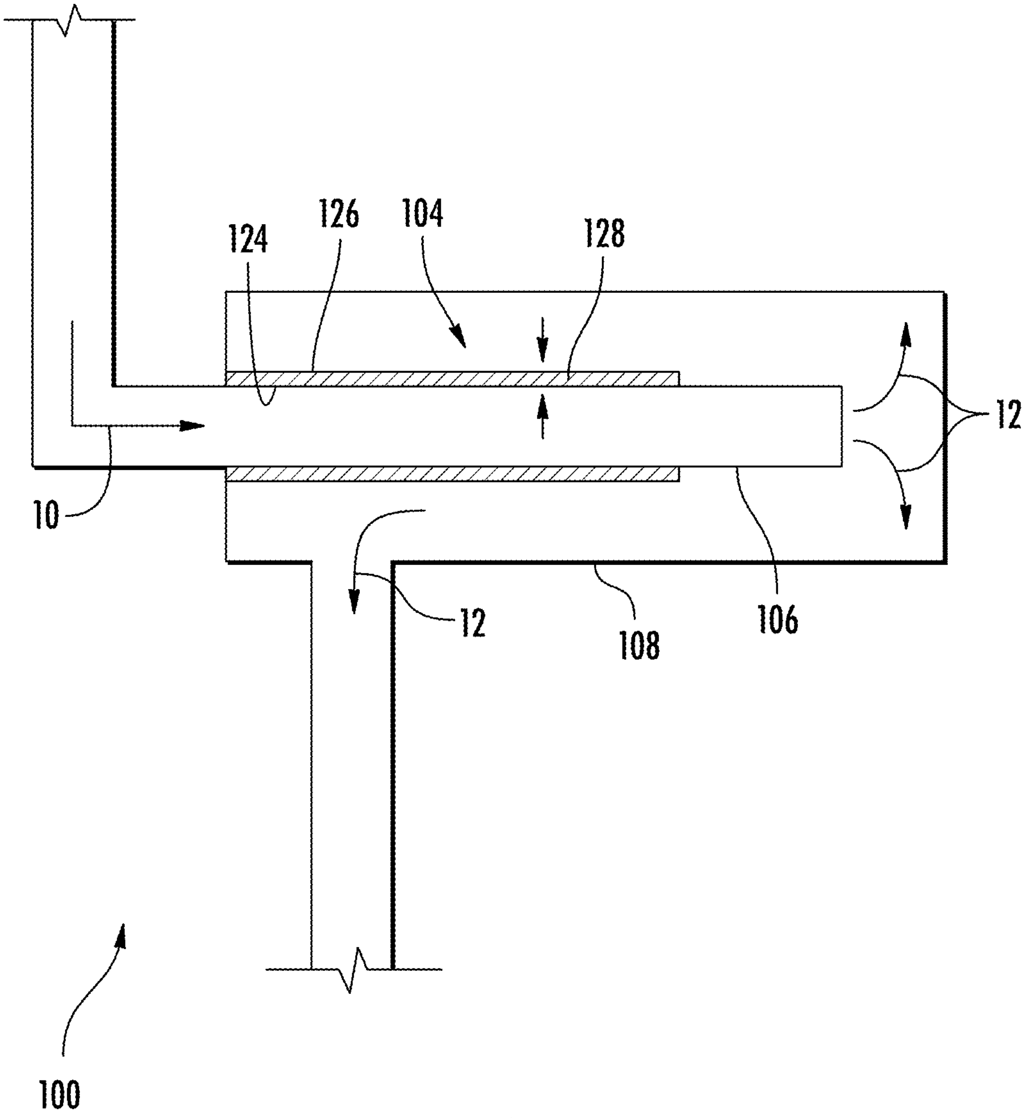
FIG. 3 is a schematic view of the fire extinguisher of FIG. 1 according to another example, showing a common wall bounding the supply conduit and the source conduit communicating heat between expanded fire suppressant agent issued by the flow control device and pressurized fire suppressant provided to the flow control device.

With reference to FIG. 3, the fire extinguisher 100 is shown according to another example. As shown in FIG. 3, the source conduit 104 and the supply conduit 108 have a common wall segment 122. The common wall segment has a first surface 124, a second surface 126, and a wall thickness 128 separating the first surface 124 from the second surface 126. It is contemplated that the common wall segment 122 bound both the source conduit 104 and the supply conduit 108 such that the heat exchanger 120 communicates the heat H (shown in FIG. 2) between the expanded fire suppressant flow 12 issued by the flow control device 106 and the pressurized fire suppressant flow 10 entering the flow control device 106. In this respect the first surface 124 bounds the source conduit 104, the second surface 126 bounds the supply conduit 108, and the wall thickness 128 communicates the heat H between the expanded fire suppressant flow 12 issued by the flow control device 106 and the pressurized fire suppressant flow 10 entering the flow control device 106.

Figure 4:
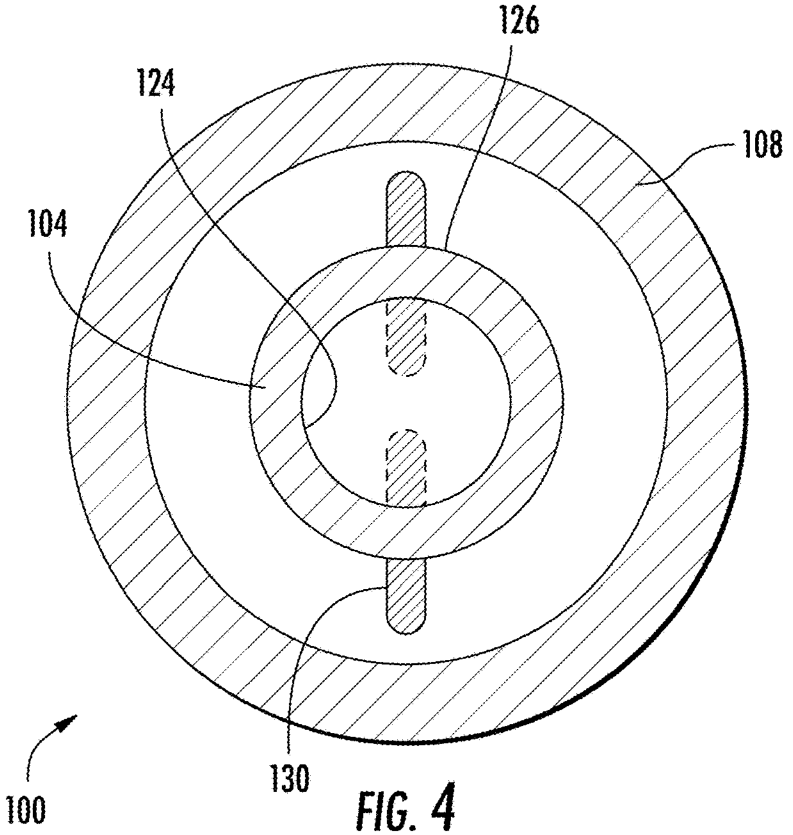
FIG. 4 is a schematic view of the fire extinguisher of FIG. 1 according to a further example, showing a fin arranged within the supply conduit communicating heat between expanded fire suppressant agent issued by the flow control device and pressurized fire suppressant provided to the flow control device.

With reference to FIG. 4, in certain examples the common wall segment 122 can have a fin 130 extending along at least a portion of its length to increase the rate of communication of the heat H (shown in FIG. 2) between the expanded fire suppressant flow 12 issued by the flow control device 106 and the pressurized fire suppressant flow 10 entering the flow control device 106. In certain examples the fin 130 extends from the first surface 124 and into the source conduit 104, increasing removal of heat from the pressurized fire suppressant flow 10 in applications where the pressurized fire suppressant flow 10 is less dense than the expanded fire suppressant flow 12 and allowing the fire extinguisher 100 to be relatively compact. It is also contemplated that the fin 130 can extend from the second surface 126 and into the supply conduit 108.

Figure 5:
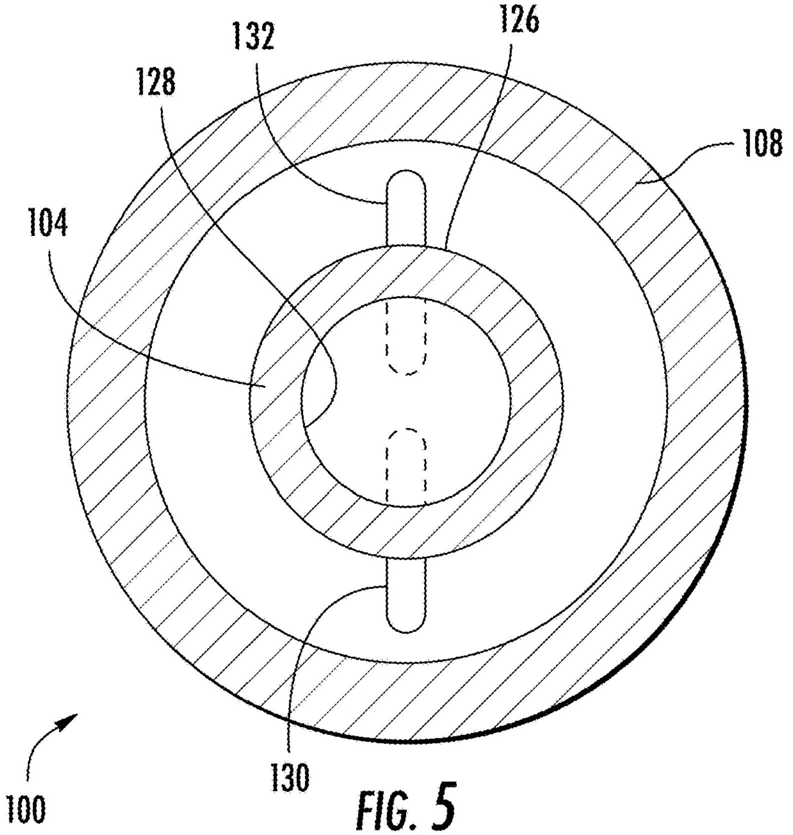
FIG. 5 is a schematic view of the fire extinguisher of FIG. 1 according to yet another example, showing a pin arranged within the supply conduit communicating heat between expanded fire suppressant agent issued by the flow control device and pressurized fire suppressant provided to the flow control device.

With reference to FIG. 5, in certain examples the common wall segment 122 can have a pin 132 extending along at least a portion of its length to increase the rate of communication of the heat H (shown in FIG. 2) between the expanded fire suppressant flow 12 issued by the flow control device 106 and the pressurized fire suppressant flow 10 entering the flow control device 106. In certain examples the pin 132 extends from the first surface 124 and into the source conduit 104, increasing removal of heat from the pressurized fire suppressant flow 10 in applications where the pressurized fire suppressant flow 10 is less dense than the expanded fire suppressant flow 12 and allowing the fire extinguisher 100 to be relatively compact. It is also contemplated that the pin 132 can extend from the second surface 126 and into the supply conduit 108.

Figure 6:
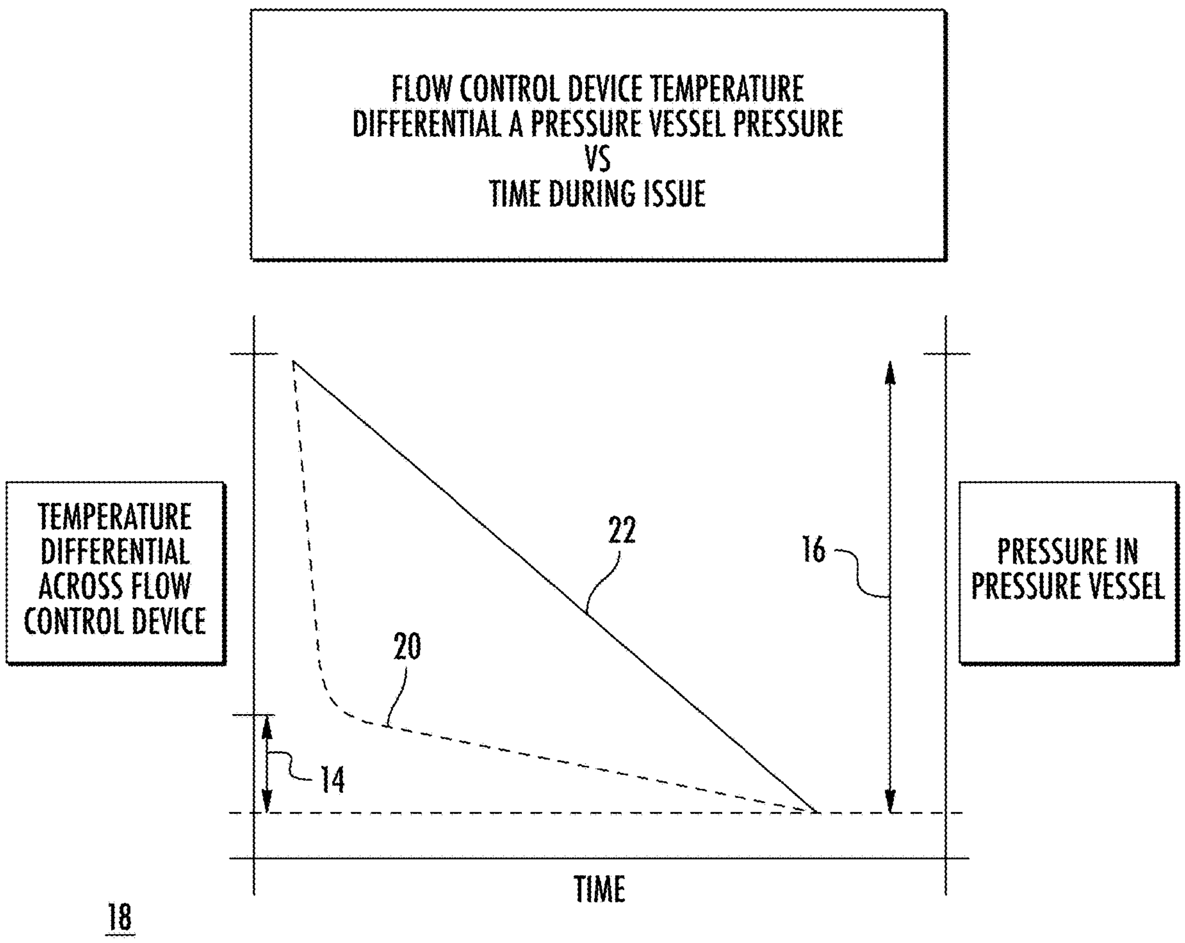
FIG. 6 is graph of temperature versus pressure during issue of pressurized fire suppressant agent from the fire extinguisher of FIG. 1, showing the temperature change during the issue in examples where heat is and is not communicated between expanded fire suppressant agent issued by the flow control device and pressurized fire suppressant provided to the flow control device.

With reference to FIG. 6, a graph 18 of flow control device temperature differential is shown. As shown with a trace 20, communication of the heat H (shown in FIG. 2) between the expanded fire suppressant flow 12 (shown in FIG. 2) issued by the flow control device 106 (shown in FIG. 2) and the pressurized fire suppressant flow 10 (shown in FIG. 2) entering the flow control device 106 causes the flow control device 106 to experience a temperature range 14 during issue of the expanded fire suppressant flow 12. In contrast, in examples where no heat is transferred between the expanded fire suppressant flow 12 issued by the flow control device 106 and the pressurized fire suppressant flow 10 entering the flow control device 106, the flow control device 106 experience a larger temperature range 16 during issue of the expanded fire suppressant flow 12, as shown with trace 22.

Figure 7:
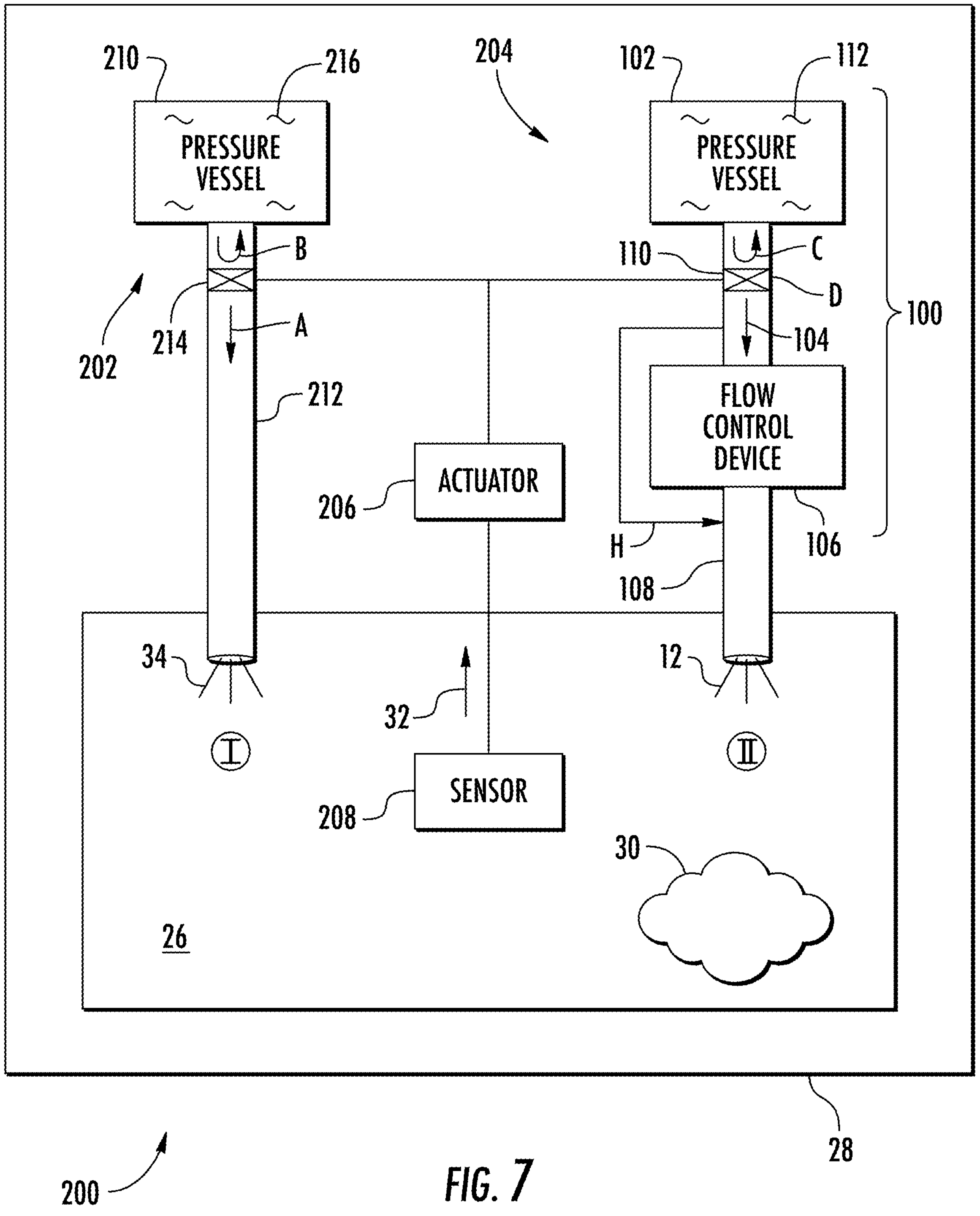
FIG. 7 is a schematic view of a fire suppression system including the fire extinguisher of FIG. 1, showing a high discharge rate section and a low discharge rate section connected to a protected space on a vehicle.

With reference to FIG. 7, a fire suppression system 200 is shown. The fire suppression system 200 includes a high rate discharge (HRD) section 202, a low rate discharge (LRD) section 204, an actuator 206, and a sensor 208. The LRD section 204 includes the fire extinguisher 100, and is additionally fluidly coupled a protected space 26 and operatively associated with the actuator 206. It is contemplated that the protected space 26 be a cargo compartment on a vehicle 28, e.g., an aircraft. However, as will be appreciated by those of skill in the art in view of present disclosure, the fire suppression system 200 can be employed in other applications, such as marine and terrestrial applications, and remain within the scope of the present disclosure.

The HRD section 202 includes an HRD pressure vessel 210, an HRD conduit 212, and an HRD retainer 214. The HRD pressure vessel 210 contains an HRD fire suppressant agent 216. In certain examples the HRD fire suppressant agent 216 includes a pressurized gas. In accordance with certain examples, the HRD fire suppressant agent 216 can include one or more of a chlorofluorocarbon compound, a hydrochlorofluorocarbon compound, a hydrofluorocarbon compound, or a mixture of such compounds. It is also contemplated that, in accordance with certain examples, that the HRD fire suppressant agent 216 have the same composition as the fire suppressant agent 112 contained with the pressure vessel 102.

The HRD pressure vessel 210 is connected to the HRD conduit 212. The HRD conduit 212 fluidly couples the HRD pressure vessel 210 to the protected space 26 and provides fluid communication between the HRD pressure vessel 210 and the protected space 26. The HRD retainer 214 is arranged along the HRD conduit 212, is operatively associated with the actuator 206, and is arranged to provide selective fluid communication between the HRD pressure vessel 210 and the protected space 26 through the operative association with the actuator 206. In this respect the HRD retainer 214 has an HRD section inactive state A, wherein the HRD retainer 214 fluidly separates the HRD pressure vessel 210 from the protected space 26, and an HRD section active state B, wherein the HRD retainer 214 fluidly couples the HRD pressure vessel 210 to the protected space 26.

The actuator 206 is operably connected to the HRD section 202 and the LRD section 204 for providing a staged response to fire 24 within the protected space 26. More specifically, the actuator 206 is connected to the HRD retainer 214 and the retainer 110, i.e., an LRD retainer, to introduce the HRD fire suppressant agent 216 and the fire suppressant agent 112 into the protected space 26 sequentially, in an HRD stage I followed temporally by an LRD stage II—the fire suppressant agent 112, i.e., an LRD suppressant agent, flowing continuously into the protected space 26 as the expanded fire suppressant flow 12 with a constant mass flow rate via the flow control device 106 with the benefit of communication of the heat H (shown in FIG. 2) between the expanded fire suppressant flow 12 issued by the flow control device 106 and the pressurized fire suppressant flow 10 (shown in FIG. 1) entering the flow control device 106, as described above.

It is contemplated that, in certain examples, that the retainer 110 be similar to the HRD retainer 214. In such examples the retainer 110 is operatively associated with the actuator 206 and is arranged to provide selective fluid communication between the pressure vessel 102, e.g., an LRD pressure vessel, and the protected space 26 through the operative association with the actuator 206. In this respect the retainer 110 has an LRD section inactive state C, wherein the retainer 110 fluidly separates the pressure vessel 102 from the protected space 26, and an LRD section active state D, wherein the retainer 110 fluidly couples the pressure vessel 102 to the protected space 26 for issue of the expanded fire suppressant flow 12 (shown in FIG. 1) into the protected space 26.

Introduction of the HRD fire suppressant agent 216, and successive introduction of the fire suppressant agent 112, is accomplished in response to receipt of a fire detected signal 32 from the sensor 208. The sensor 208 is in turn disposed in communication with the protected space 26 and the actuator 206, and is configured to provide the fire detected signal 32 to the actuator 206 upon detection of the fire 30 within the protected space 26.

Figure 8:
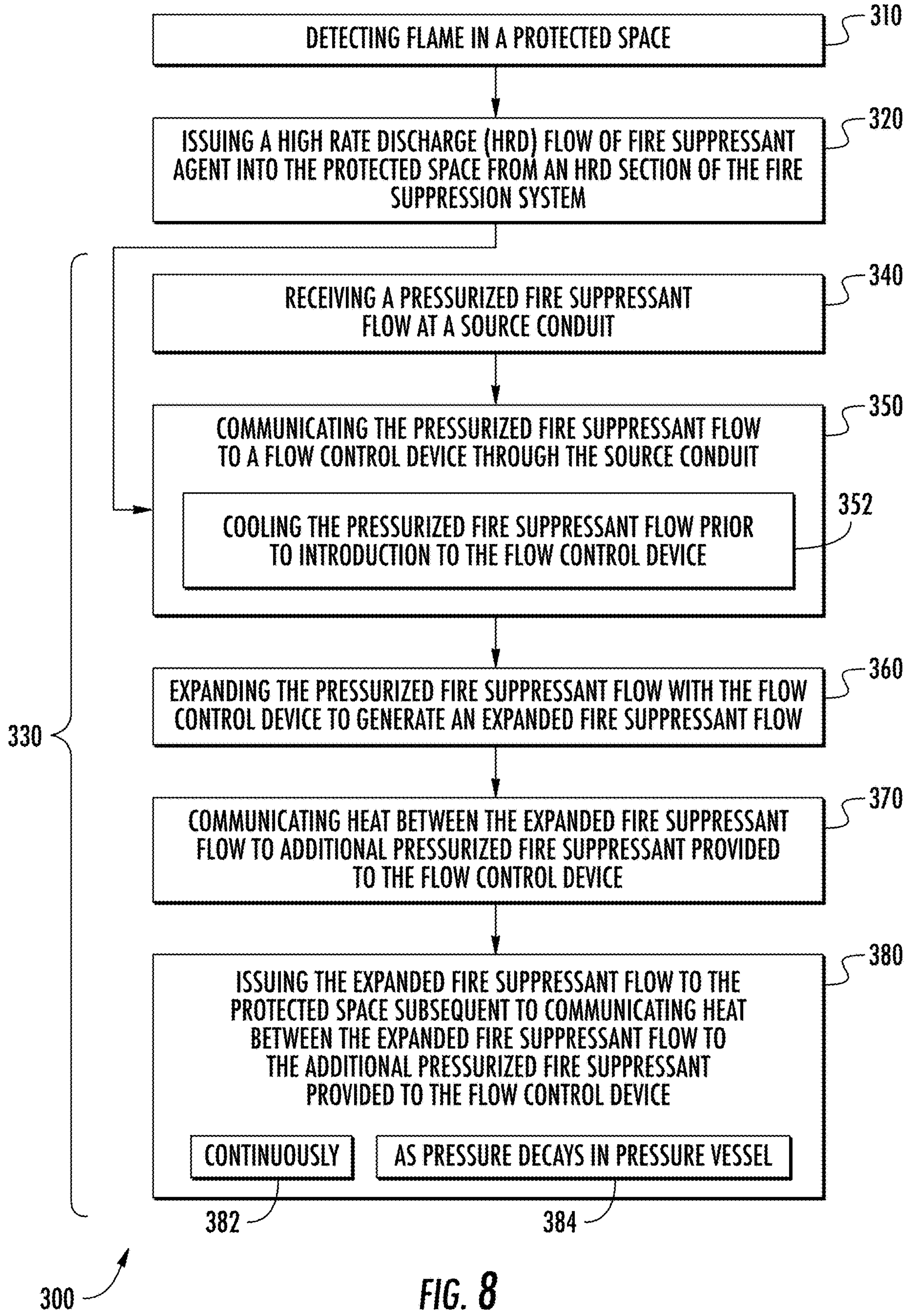
FIG. 8 is a block diagram of a method of controlling flow of fire suppression agent through a fire extinguisher, showing operations of the method according to an illustrative and non-limiting example of the method.

With reference to FIG. 8, a method 300 of controlling flow of a fire suppressant agent, e.g., the fire suppressant agent 112 (shown in FIG. 1), is shown. The method 300 includes detecting presence of fire within a protected space, e.g., the fire 24 (shown in FIG. 7) within the protected space 26, as shown with box 310. The method 300 also includes issuing an HRD fire suppressant flow into the protected space, e.g., the HRD fire suppressant flow 34 (shown in FIG. 7), as shown with box 320. The method 300 further includes issuing an LRD fire suppressant flow into the proceed space, e.g., the expanded fire suppressant flow 12 (shown in FIG. 1), as shown with bracket 330.

As shown with box 340, issuing the LRD fire suppressant flow includes receiving a pressurized fire suppressant flow at a source conduit, e.g., the pressurized fire suppressant flow 10 (shown in FIG. 1) at the source conduit 104 (shown in FIG. 1). The pressurized fire suppressant flow is communicated by source conduit to a flow control device, e.g., the flow control device 106 (shown in FIG. 1), as shown with box 350. It is contemplated that the pressurized fire suppressant flow be cooled prior to introduction into the flow control device, as shown with box 352.

As the pressurized fire suppressant flow traverses the flow control device the flow control device expands the pressurized fire suppressant flow, generating an expanded fire suppressant flow, as shown with box 360. The expanded fire suppressant flow is communicated to a supply conduit, e.g., the supply conduit 108 (shown in FIG. 1), which communicates heat, e.g., the heat H (shown in FIG. 1), between additional pressurized fire suppressant traversing the source conduit prior to the pressurized fire suppressant entering the flow control device, as shown with box 370. The expanded fire suppressant flow is thereafter issued into the protected space by the supply conduit subsequent to communicating the heat between the expanded fire suppressant flow and the additional pressurized fire suppressant provided to the flow control device, as show with box 380. As shown with box 382 and box 384, it is contemplated that the communication of the heat take place continuously during the LRD issue into the protected space and that mass flow rate of the LRD issue be constant as pressure of the pressurized fire suppressant decays during the LRD issue.

Fire suppression systems commonly expand pressurized fire suppression agent using a flow control device once actuated. Expansion of the pressurized fire suppression agent generally causes the fire suppression agent to cool, changing to the flow control device flow characteristics. As a consequence, flow control devices generally must be adapted to compensate for temperature effects during discharge to control mass flow rate constantly throughout a temperature range during discharge.

In examples described herein fire suppression systems employ the thermal expansion cooling effect to stabilize fire suppression agent entering the flow control device to a constant temperature independent of the fire extinguisher temperature. In certain examples the flow of fire suppression agent downstream of the flow control device is directed to thermally communicate with the flow entering the flow control device. The thermal communication between the fire suppression agent exiting the flow control device and the fire suppression agent entering the flow control device reduces the temperature range experienced by the flow control device during discharge limits change in fluid properties of the fire suppression agent during discharge, limiting the need of the flow control device to compensate for change in the fluid properties of the flow of fire suppression agent, and limiting (or eliminating entirely) the need of the flow control device for property changes beyond pressure to provide a constant mass flow rate throughout the discharge period.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A fire extinguisher, comprising:

a source conduit;

a flow control device connected to the source conduit;

a supply conduit connected to the flow control device and fluidly coupled therethrough to the source conduit, wherein the supply conduit is thermally coupled to the source conduit to communicate heat between an expanded fire suppressant flow issued by the flow control device and a pressurized fire suppressant flow entering the flow control device; and a heat exchanger disposed along the source conduit upstream of the flow control device and having the supply conduit directed therethrough such that heat is communicated between the pressurized fire suppressant flow and the expanded fire suppressant flow at the heat exchanger;

wherein the flow control device includes a valve at least partially separating the source conduit from the supply conduit.

2. The fire extinguisher of claim 1, wherein the expanded fire suppressant flow in the supply conduit flows in a direction opposite the pressurized fire suppressant flow in the source conduit.

3. The fire extinguisher of claim 1, wherein the source conduit and the supply conduit have a common wall segment with a first surface and a second surface separated by a wall thickness, the first surface bounding the source conduit, and the second surface bounding the supply conduit.

4. The fire extinguisher of claim 3, further comprising a fin extending from at least one of the first surface and the second surface of the common wall segment the wall thickness thermally coupling the fin to the other of the first surface and the second surface.

5. The fire extinguisher of claim 3, further comprising a pin extending from at least one of the first surface and the second surface of the common wall segment, the wall thickness thermally coupling the pin to the other of the first surface and the second surface.

6. The fire extinguisher of claim 1, wherein the flow control device includes an orifice plate at least partially separating the source conduit from the supply conduit.

7. The fire extinguisher of claim 1, further comprising a pressure vessel connected to the source conduit and fluidly coupled therethrough to the flow control device.

8. The fire extinguisher of claim 7, further comprising a pressurized fire suppressant agent contained within the pressure vessel.

9. The fire extinguisher of claim 7, further comprising a pressurized fire suppressant agent including one or one or more of a chlorofluorocarbon compound, a hydrochlorofluorocarbon compound, a hydrofluorocarbon compound, and a mixture thereof contained within the pressure vessel.

10. The fire extinguisher of claim 1, further comprising a retainer arranged along the source conduit having an active state and an inactive state, the retainer fluidly coupling a pressure vessel to the flow control device in the active state, the retainer fluidly separating the pressure vessel from the flow control device in the inactive state.

11. The fire extinguisher of claim 10, further comprising an actuator operatively connected to the retainer and arranged to switch the retainer between the active state and the inactive state.

12. The fire extinguisher of claim 11, further comprising a sensor configured to detect fire within a protected space and disposed in communication with the actuator.

13. The fire extinguisher of claim 1, wherein the supply conduit is in fluid communication with a cargo compartment on an aircraft.

14. A fire suppression system, comprising:

a first discharge (LRD) section having a first mass flow rate of fire suppressant flow including a fire extinguisher as recited in claim 1, wherein the supply conduit is in fluid communication with a protected space;

a second discharge (HRD) section having a second mass flow rate of fire suppressant flow greater than the first mass flow rate in fluid communication with the protected space;

a sensor disposed in communication with the protected space and arranged to detect fire in the protected space; and an actuator disposed in communication with the sensor operably connected to the LRD section and the HRD section.

15. The fire suppression system of claim 14, wherein:

the LRD section includes:

an LRD pressure vessel connected to the source conduit and fluidly coupled therethrough to the flow control device; and an LRD pressurized fire suppressant agent including one or one or more of a chlorofluorocarbon compound, a hydrochlorofluorocarbon compound, a hydrofluorocarbon compound and a mixture thereof contained within the LRD pressure vessel; and wherein the HRD section includes:

an HRD pressure vessel connected to the protected space by the HRD section; and an HRD pressurized fire suppressant agent including one or one or more of a chlorofluorocarbon compound, a hydrochlorofluorocarbon compound, a hydrofluorocarbon compound, and a mixture thereof contained within the HRD pressure vessel.

16. The fire suppression system of claim 14, wherein the source conduit has a wall with a first surface and a second surface separated by a wall thickness, the first surface bounding the source conduit, and the second surface bounding the supply conduit, wherein the expanded fire suppressant flow traversing the supply conduit opposes the pressurized fire suppressant flow traversing the source conduit, and wherein the supply conduit is in fluid communication with a cargo compartment on an aircraft.

* * * * *